United States Patent
Mattison

(10) Patent No.: US 11,689,617 B1
(45) Date of Patent: Jun. 27, 2023

(54) SYSTEM FOR TRIGGERING RESOURCE CHANNEL MAPPING FOR DYNAMIC AUTHENTICATION

(71) Applicant: BANK OF AMERICA CORPORATION, Charlotte, NC (US)

(72) Inventor: Paul Martin Mattison, Sherrills Ford, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 17/569,568

(22) Filed: Jan. 6, 2022

(51) Int. Cl.
*H04L 12/00* (2006.01)
*H04L 67/1074* (2022.01)
*G06Q 20/40* (2012.01)
*H04L 9/40* (2022.01)

(52) U.S. Cl.
CPC ....... *H04L 67/1076* (2013.01); *G06Q 20/401* (2013.01); *H04L 63/10* (2013.01); *H04L 67/1078* (2013.01)

(58) Field of Classification Search
CPC . H04L 67/1076; H04L 63/10; H04L 67/1078; G06Q 20/401
USPC .......................................... 709/203
See application file for complete search history.

(56) References Cited

U.S. PATENT DOCUMENTS

| | | | |
|---|---|---|---|
| 10,015,795 B1 * | 7/2018 | Wolf | ............ H04W 76/11 |
| 10,410,235 B2 | 9/2019 | Faith | |
| 10,484,178 B2 | 11/2019 | Andrade | |
| 10,489,565 B2 | 11/2019 | Jurss et al. | |
| 10,700,875 B1 | 6/2020 | Daruwalla et al. | |
| 10,796,016 B2 | 10/2020 | Legler | |
| 10,896,419 B2 | 1/2021 | Sivashanmugam et al. | |
| 10,911,423 B2 | 2/2021 | Kim et al. | |
| 10,915,937 B1 | 2/2021 | Hecht | |
| 11,068,898 B2 | 7/2021 | Allen | |
| 11,232,449 B1 | 1/2022 | Hecht | |
| 11,368,460 B2 | 6/2022 | Vanguri et al. | |
| 2011/0029428 A1 | 2/2011 | Song et al. | |
| 2013/0339248 A1 | 12/2013 | Hubert et al. | |
| 2016/0021252 A1 * | 1/2016 | Williams | ............ H04M 3/5175 379/265.11 |
| 2018/0225656 A1 | 8/2018 | Ray et al. | |
| 2018/0322480 A1 | 11/2018 | Solis Monsanto | |
| 2019/0266600 A1 | 8/2019 | R | |
| 2020/0052897 A1 | 2/2020 | Girish et al. | |

(Continued)

*Primary Examiner* — Frantz Coby
(74) *Attorney, Agent, or Firm* — Moore & Van Allen PLLC; Anup Shrinivasan Iyer

(57) ABSTRACT

Systems, computer program products, and methods are described herein for triggering resource channel mapping for dynamic authentication. The present invention is configured to receive, from a user input device, a request from a user to access resources via a first resource channel; retrieve information associated with the user; query a resource channel repository using the information associated with the user; retrieve, from the resource channel repository, information associated with a second resource channel based on at least the query, wherein the second resource channel is associated with the user; in response, automatically trigger a resource channel mapping engine; map, using the resource channel mapping engine, the second resource channel and the first resource channel; and in response, authorize the request to access the resources via the first resource channel.

20 Claims, 2 Drawing Sheets

(56) References Cited

U.S. PATENT DOCUMENTS

| | | |
|---|---|---|
| 2020/0175496 A1 | 6/2020 | Finke et al. |
| 2020/0358771 A1 | 11/2020 | Vanguri et al. |
| 2021/0383377 A1 | 12/2021 | Zhou et al. |
| 2022/0124676 A1* | 4/2022 | Hwang ............ H04W 72/0453 |

* cited by examiner

SYSTEM FOR TRIGGERING RESOURCE CHANNEL MAPPING FOR DYNAMIC AUTHENTICATION

FIELD OF THE INVENTION

The present invention embraces a system for triggering resource channel mapping for dynamic authentication.

BACKGROUND

In recent years, peer-to-peer (P2P) resource transfers have developed to describe a new way of exchanging resources without relying on traditional intermediaries. As more users and/or entities adopt P2P resource transfer systems, there exists an authorization disconnect between P2P resource transfers and existing resource transfer methods, causing a need for a system for triggering resource channel mapping for dynamic authentication.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for triggering resource channel mapping for dynamic authentication is presented. The system comprising: at least one non-transitory storage device; and at least one processor coupled to the at least one non-transitory storage device, wherein the at least one processor is configured to: electronically receive, from a user input device, a request from a user to access resources via a first resource channel; retrieve information associated with the user; query a resource channel repository using the information associated with the user; retrieve, from the resource channel repository, information associated with a second resource channel based on at least the query, wherein the second resource channel is associated with the user; in response, automatically trigger a resource channel mapping engine; map, using the resource channel mapping engine, the second resource channel and the first resource channel; and in response, authorize the request to access the resources via the first resource channel.

In some embodiments, the at least one processor is further configured to: retrieve, using the resource channel mapping engine, one or more access management authorization requirements associated with the second resource channel.

In some embodiments, the at least one processor is further configured to: dynamically generate an authentication prompt based on at least the one or more access management authorization requirements associated with the second resource channel; and transmit control signals configured to cause the user input device to display the authentication prompt.

In some embodiments, the at least one processor is further configured to: electronically receive, from the user input device, one or more authentication credentials in response to the authentication prompt; determine that the one or more authentication credentials meet the one or more access management requirements associated with the second resource channel; and in response, map, using the resource channel mapping engine, the second resource channel and the first resource channel.

In some embodiments, the request to access the resources further comprises a user presentment of a payment instrument.

In some embodiments, the second resource channel comprises peer-to-peer (P2P) resource transfer.

In some embodiments, the at least one processor is further configured to: transmit control signals configured to cause the user input device to display a notification that the first resource channel is mapped with the second resource channel; in response, electronically receive, from the user input device, a user input to switch from the first resource channel to the second resource channel to access the resources; and in response, authorize the request to access the resources via the second resource channel.

In another aspect, a computer program product for triggering resource channel mapping for dynamic authentication is presented. The computer program product comprising a non-transitory computer-readable medium comprising code causing a first apparatus to: electronically receive, from a user input device, a request from a user to access resources via a first resource channel; retrieve information associated with the user; query a resource channel repository using the information associated with the user; retrieve, from the resource channel repository, information associated with a second resource channel based on at least the query, wherein the second resource channel is associated with the user; in response, automatically trigger a resource channel mapping engine; map, using the resource channel mapping engine, the second resource channel and the first resource channel; and in response, authorize the request to access the resources via the first resource channel.

In yet another aspect, a method for triggering resource channel mapping for dynamic authentication is presented. The method comprising: electronically receiving, from a user input device, a request from a user to access resources via a first resource channel; retrieving information associated with the user; querying a resource channel repository using the information associated with the user; retrieving, from the resource channel repository, information associated with a second resource channel based on at least the query, wherein the second resource channel is associated with the user; in response, automatically triggering a resource channel mapping engine; mapping, using the resource channel mapping engine, the second resource channel and the first resource channel; and in response, authorizing the request to access the resources via the first resource channel.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
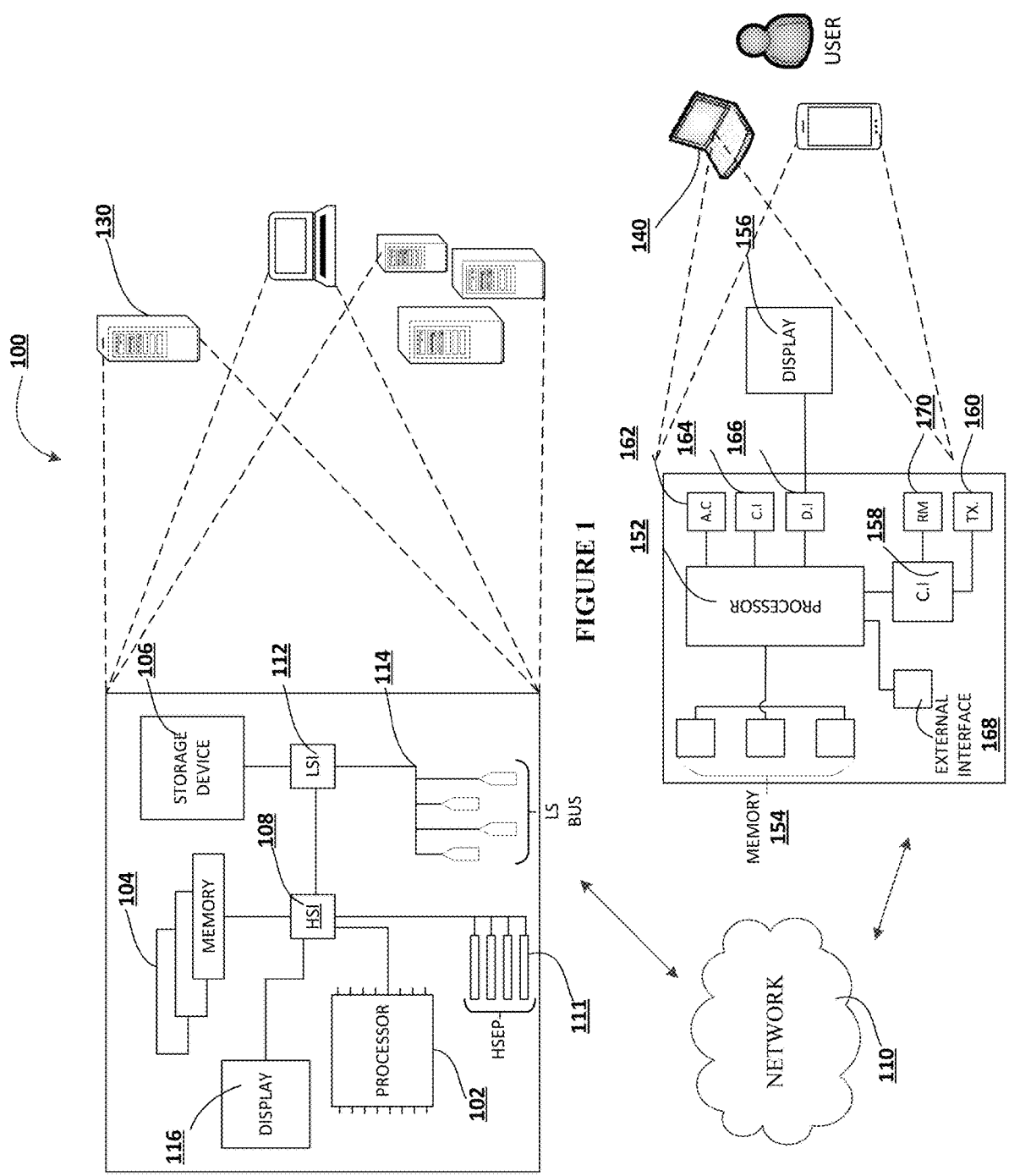
Figure 2:
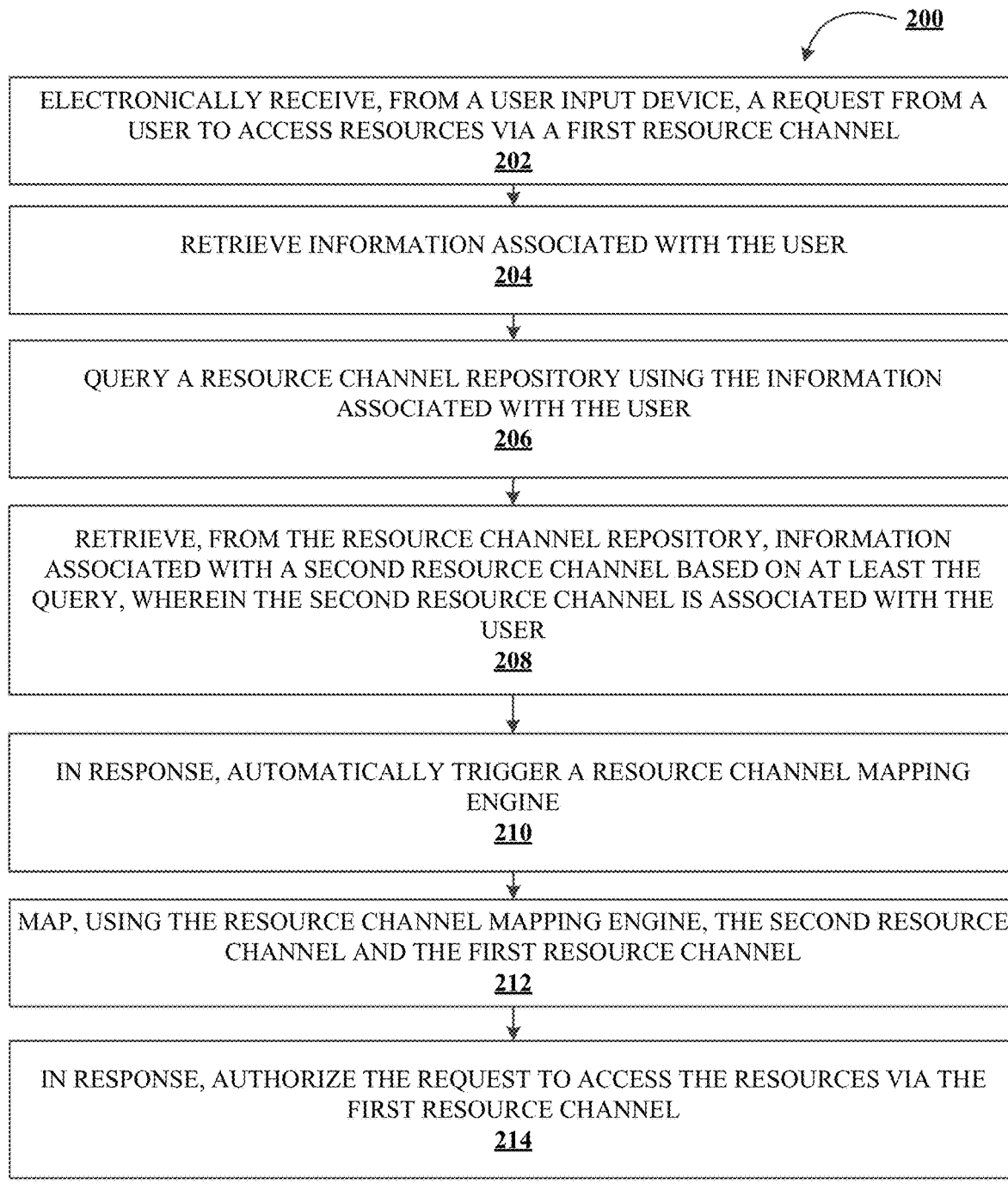

Having thus described embodiments of the invention in general terms, reference will now be made the accompanying drawings, wherein:

FIG. 1 illustrates technical components of a system for triggering resource channel mapping for dynamic authentication, in accordance with an embodiment of the invention;

FIG. 2 illustrates a process flow for triggering resource channel mapping for dynamic authentication, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource access," "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

In recent years, peer-to-peer (P2P) resource transfers have developed to describe a new way of exchanging resources without relying on traditional intermediaries. As more users and/or entities adopt P2P resource transfer systems, there exists an authorization disconnect between P2P resource transfers and existing resource transfer methods, causing a need for a system for triggering resource channel mapping for dynamic authentication. In other words, there is no linkage between the P2P resource transfer process and traditional payment instrument transfer process. While receiving entities (e.g., other financial institutions) may be able validate whether a user is associated with the P2P resource distribution account using a unique user identifier, there is an authorization disconnect between the authorization required to execute a P2P resource transfer and an authorization required to execute the traditional payment instrument transfer. Therefore, there is a need ensure that receiving entities have proper information to reconcile accurate resource transfers with minimal exposure.

Accordingly, the present invention receives, from a user input device, a request from a user to access resources (e.g., transaction) within a distributed network, via a first resource channel (e.g., payment instrument network). To be eligible to access resources within the distributed network via a particular resource channel, the user may be required to register with the entity. The registration process includes gathering and verifying user-specific information. Depending on the particular resource channel, the requirements for user-specific information may vary. The user may be required to establish independent access management authorization requirements for each resource channel during the registration process. On successful registration, user-specific information for each resource channel may be stored in a resource channel repository along with their corresponding access management authorization requirements. Next, the present invention retrieves information associated with the user. By querying the resource channel repository using the information associated with the user, the system may be configured to identify other resource channels available to the user for accessing resources. Based on the query, the present invention retrieves, from the resource channel repository, information associated with a second resource channel (e.g., P2P resource transfer). In response, the present invention automatically triggers a resource channel mapping engine to link authorization procedures between multiple resource channels for the users. Using the resource channel mapping engine, the present invention links the second resource channel and the first resource channel. To this end, the present invention retrieves, using the resource channel mapping engine, one or more access management authorization requirements associated with the second resource channel. Based on the access management authorization requirements, the present invention dynamically generates an authentication prompt for the user. The authentication prompt may require the user to input authentication credentials for verification purposes. The present invention determines that the authentication credentials meet the access management requirements associated with the second resource channel. In response, maps/links the two resource channels. Once the resource channels are linked, the present invention authorizes the request to access the resources via the first resource channel. In the alternative, the present invention allows the user to switch to the second resource channel to access the resources.

FIG. 1 illustrates technical components of a system for triggering resource channel mapping for dynamic authentication 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface (HSI) 108 connecting to memory 104, and a low-speed interface (LSI) 112 connecting to low speed (LS) bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multiprocessor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface (CI) 158, and a transceiver (TX.) 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface (CI) 164 and display interface (DI) 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module (RM) 170 may provide additional navigation—and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec (AC) 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for triggering resource channel mapping for dynamic authentication 200, in accordance with an embodiment of the invention. As shown in block 202, the process flow includes electronically receiving, from a user input device, a request from a user to access resources within a distributed network, via a first resource channel. In some embodiments, to be eligible to access resources within the distributed network via a particular resource channel, the user may be required to register with the entity. The registration process typically includes gathering and verifying user-specific information beforehand. Depending on the particular resource channel, the requirements for user-specific information may vary. In one example, if the request is to access the resources via a user presentment of a payment instrument, the user-specific information requirements may include personal identification information, i.e., information that identifies the user such as a full name, Social Security number, driver's license number, bank account number, passport number, and/or the like. In another example, if the request is to access the resources via a user input device, the user-specific information requirements may additionally include device configuration parameters, i.e., information associated with the user input device such as a unique device identification number, a device type, device address, network address, device permission levels, and/or the like. In yet another example, if the request is to access the resources via peer-to-peer (P2P) transfer, the user-specific information requirements may additionally include publicly identifiable information (e.g., phone number, e-mail address, and/or the like) that is used to identify the user to one or more users within the distributed network.

In some embodiments, the user may be required to establish independent access management authorization requirements for each resource channel during the registration process. The access management authorization requirements may be unique to each resource channel. An access management authorization requirement established for one resource channel may not be applicable to the authentication procedure for another resource channel. Each access management authorization requirement may include a set of authentication credentials. While some of these authentication credentials may overlap for certain access management authorization requirements, some may not. For example, the access management authorization requirement for a request to access resources using a payment instrument may include a chip-card verification procedure, while the authentication procedure for a request to access resources using a P2P transfer may include a username/password and PIN requirement. In some embodiments, the access management authorization requirement for each resource channel may be established by the entity that manages the resources and the resource channels. On successful registration, user-specific information for each resource channel may be stored in a resource channel repository along with their corresponding access management authorization requirements.

Next, as shown in block 204, the process flow includes retrieving information associated with the user. In embodiments where the request to access the resources includes a user presentment of a payment instrument, the system may be configured to automatically capture information associated with the user directly from the payment instrument. Typically, information capable of capture from the payment instrument may be limited. However, this information is cross-checked with internal data repositories to identify addition information associated with the user.

Next, as shown in block 206, the process flow includes querying a resource channel repository using the information associated with the user. By querying the resource channel repository using the information associated with the user, the system may be configured to identify other resource channels available to the user for accessing resources.

Next, as shown in block 208, the process flow includes retrieving, from the resource channel repository, information associated with a second resource channel based on at least the query, wherein the second resource channel is associated with the user. In some embodiments, the second resource channel may include a P2P resource transfer, i.e., instant resource transfers that make it simple and secure to transact with friends, family, trusted businesses and professionals without a dedicated payment instrument such as a card, or check, or traditional multi-step wire transfer process.

Next, as shown in block 210, the process flow includes, in response, automatically triggering a resource channel mapping engine. The resource channel mapping engine may be used to link authorization procedures between multiple resource channels for the users.

Next, as shown in block 212, the process flow includes mapping, using the resource channel mapping engine, the second resource channel and the first resource channel. In some embodiments, to map the two resource channels, i.e., the first resource channel and the second resource channel, the system may be configured to retrieve, using the resource channel mapping engine, one or more access management authorization requirements associated with the second resource channel. Based on the access management authorization requirements, the system may be configured to dynamically generate an authentication prompt for the user. Once generated, the system may be configured to transmit control signals configured to cause the user input device to display the authentication prompt. In some embodiments, the authentication prompt may require the user to input authentication credentials for verification purposes. Accordingly, the system may be configured to electronically receive, from the user input device, one or more authentication credentials in response to the authentication prompt. Once received, the system may be configured to determine that the one or more authentication credentials meet the one or more access management requirements associated with the second resource channel. In response, the system may be configured map, using the resource channel mapping engine, the second resource channel and the first resource channel.

Next, as shown in block 214, the process flow includes, in response, authorize the request to access the resources via the first resource channel.

In some embodiments, once the resource channels are mapped, the system may be configured to transmit control signals configured to cause the user input device to display a notification that the first resource channel is mapped with the second resource channel. In response, the system may be configured to electronically receive, from the user input device, a user input to switch from the first resource channel to the second resource channel to access the resources. Based on the user input, the system may be configured to authorize the request to access the resources via the second resource channel.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for triggering resource channel mapping for dynamic authentication, the system comprising:
   at least one non-transitory storage device; and
   at least one processor coupled to the at least one non-transitory storage device, wherein the at least one processor is configured to:
   electronically receive, from a user input device, a request from a user to access resources via a first resource channel;
   retrieve information associated with the user;
   query a resource channel repository using the information associated with the user;
   retrieve, from the resource channel repository, information associated with a second resource channel based on at least the query, wherein the second resource channel is associated with the user;
   in response, automatically trigger a resource channel mapping engine;
   map, using the resource channel mapping engine, the second resource channel and the first resource channel; and
   in response, authorize the request to access the resources via the first resource channel.

2. The system of claim 1, wherein the at least one processor is further configured to:
   retrieve, using the resource channel mapping engine, one or more access management authorization requirements associated with the second resource channel.

3. The system of claim 2, wherein the at least one processor is further configured to:
   dynamically generate an authentication prompt based on at least the one or more access management authorization requirements associated with the second resource channel; and
   transmit control signals configured to cause the user input device to display the authentication prompt.

4. The system of claim 3, wherein the at least one processor is further configured to:
   electronically receive, from the user input device, one or more authentication credentials in response to the authentication prompt;
   determine that the one or more authentication credentials meet the one or more access management requirements associated with the second resource channel; and
   in response, map, using the resource channel mapping engine, the second resource channel and the first resource channel.

5. The system of claim 1, wherein the request to access the resources further comprises a user presentment of a payment instrument.

6. The system of claim 1, wherein the second resource channel comprises peer-to-peer (P2P) resource transfer.

7. The system of claim 1, wherein the at least one processor is further configured to:
 transmit control signals configured to cause the user input device to display a notification that the first resource channel is mapped with the second resource channel;
 in response, electronically receive, from the user input device, a user input to switch from the first resource channel to the second resource channel to access the resources; and
 in response, authorize the request to access the resources via the second resource channel.

8. A computer program product for triggering resource channel mapping for dynamic authentication, the computer program product comprising a non-transitory computer-readable medium comprising code causing a first apparatus to:
 electronically receive, from a user input device, a request from a user to access resources via a first resource channel;
 retrieve information associated with the user;
 query a resource channel repository using the information associated with the user;
 retrieve, from the resource channel repository, information associated with a second resource channel based on at least the query, wherein the second resource channel is associated with the user;
 in response, automatically trigger a resource channel mapping engine;
 map, using the resource channel mapping engine, the second resource channel and the first resource channel; and
 in response, authorize the request to access the resources via the first resource channel.

9. The computer program product of claim 8, wherein the code further causes the first apparatus to:
 retrieve, using the resource channel mapping engine, one or more access management authorization requirements associated with the second resource channel.

10. The computer program product of claim 9, wherein the code further causes the first apparatus to:
 dynamically generate an authentication prompt based on at least the one or more access management authorization requirements associated with the second resource channel; and
 transmit control signals configured to cause the user input device to display the authentication prompt.

11. The computer program product of claim 10, wherein the code further causes the first apparatus to:
 electronically receive, from the user input device, one or more authentication credentials in response to the authentication prompt;
 determine that the one or more authentication credentials meet the one or more access management requirements associated with the second resource channel; and
 in response, map, using the resource channel mapping engine, the second resource channel and the first resource channel.

12. The computer program product of claim 8, wherein the request to access the resources further comprises a user presentment of a payment instrument.

13. The computer program product of claim 8, wherein the second resource channel comprises peer-to-peer (P2P) resource transfer.

14. The computer program product of claim 8, wherein the code further causes the first apparatus to:
 transmit control signals configured to cause the user input device to display a notification that the first resource channel is mapped with the second resource channel;
 in response, electronically receive, from the user input device, a user input to switch from the first resource channel to the second resource channel to access the resources; and
 in response, authorize the request to access the resources via the second resource channel.

15. A method for triggering resource channel mapping for dynamic authentication, the method comprising:
 electronically receiving, from a user input device, a request from a user to access resources via a first resource channel;
 retrieving information associated with the user;
 querying a resource channel repository using the information associated with the user;
 retrieving, from the resource channel repository, information associated with a second resource channel based on at least the query, wherein the second resource channel is associated with the user;
 in response, automatically triggering a resource channel mapping engine;
 mapping, using the resource channel mapping engine, the second resource channel and the first resource channel; and
 in response, authorizing the request to access the resources via the first resource channel.

16. The method of claim 15, wherein the method further comprises:
 retrieving, using the resource channel mapping engine, one or more access management authorization requirements associated with the second resource channel.

17. The method of claim 16, wherein the method further comprises:
 dynamically generating an authentication prompt based on at least the one or more access management authorization requirements associated with the second resource channel; and
 transmitting control signals configured to cause the user input device to display the authentication prompt.

18. The method of claim 17, wherein the method further comprises:
 electronically receiving, from the user input device, one or more authentication credentials in response to the authentication prompt;
 determining that the one or more authentication credentials meet the one or more access management requirements associated with the second resource channel; and
 in response, mapping, using the resource channel mapping engine, the second resource channel and the first resource channel.

19. The method of claim 15, wherein the request to access the resources further comprises a user presentment of a payment instrument.

20. The method of claim 15, wherein the second resource channel comprises peer-to-peer (P2P) resource transfer.

* * * * *